May 16, 1967 H. W. SCHAAF 3,319,560
DIRECTIONAL AIR VENT NOZZLE WITH FLEXING VANES
Filed Oct. 11, 1965 2 Sheets-Sheet 1
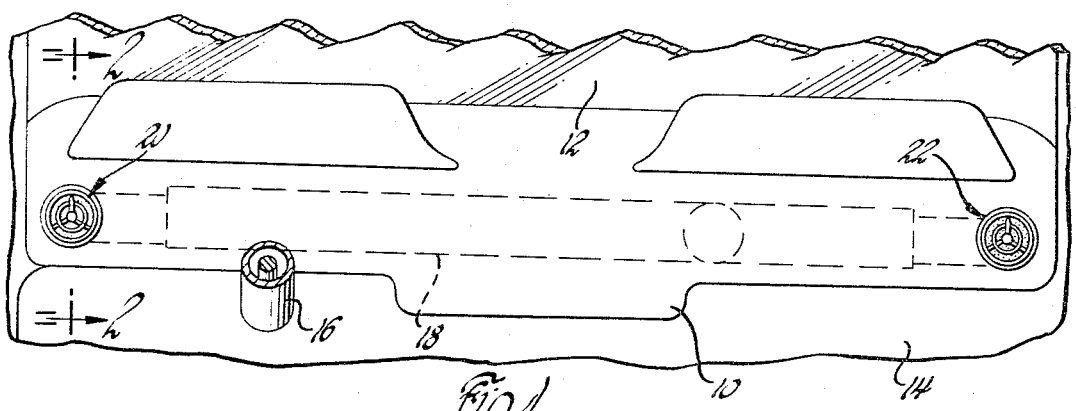
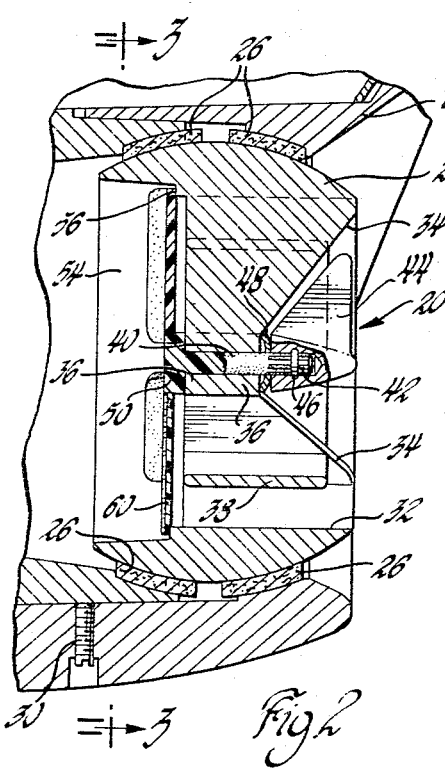
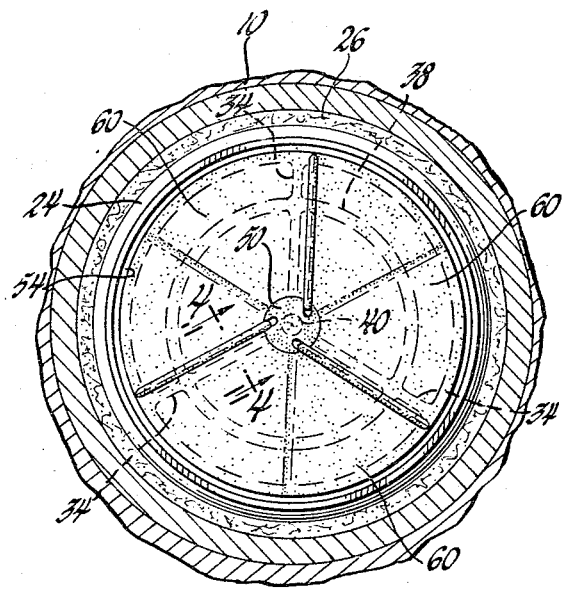
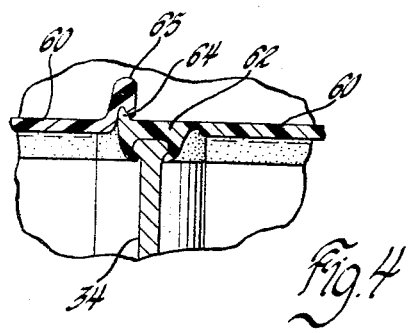
INVENTOR.
Henry W. Schaaf
BY
George E. Johnson
ATTORNEY

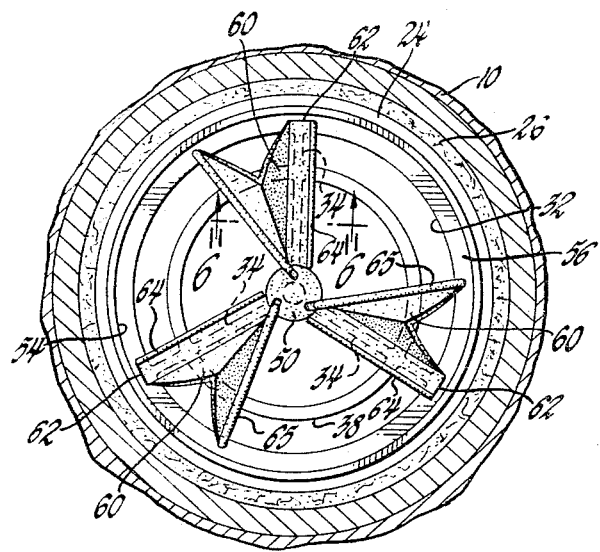
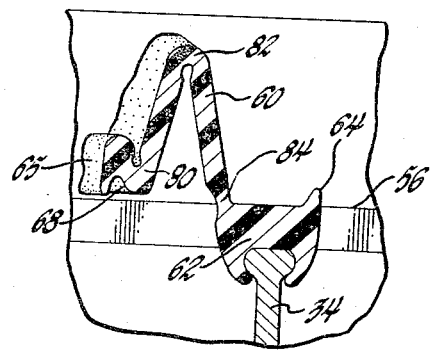
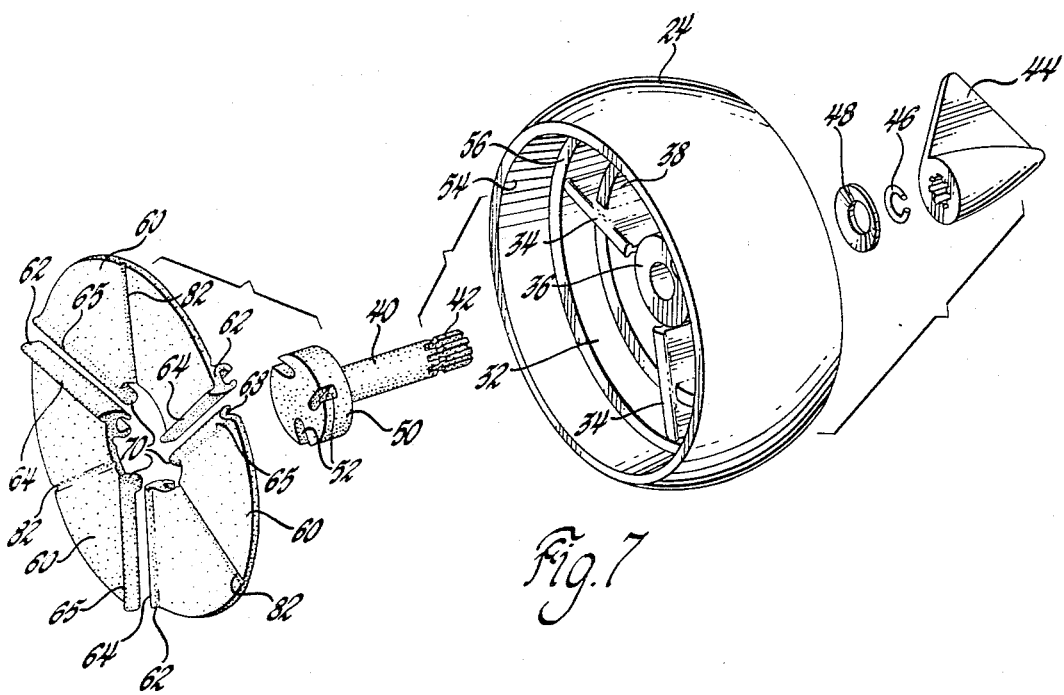

United States Patent Office 3,319,560
Patented May 16, 1967

3,319,560
**DIRECTIONAL AIR VENT NOZZLE
WITH FLEXING VANES**
Henry W. Schaaf, Ortonville, Mich., assignor to General Motors Corporation, Detroit, Mich., a corporation of Delaware
Filed Oct. 11, 1965, Ser. No. 494,819
6 Claims. (Cl. 98—40)

This invention relates to nozzles and more particularly to air vent nozzles for directing air in a desired direction for the ventilating, heating or air-conditioning of spaces such as passenger compartments of automobiles.

The directing of conditioned air into a passenger compartment either by the force of a blower or by ram effect due to vehicle movement has often been done by the use of a spherical ball-nozzle which is mounted on a support such as an instrument panel for rotational or universal movement by manual adjustment. Separate valves have been used to control the volume of flow through the nozzles and such an arrangement is disclosed in the United States Patent 3,103,155 granted September 10, 1963 in the names of H. W. Boylan and E. E. Haight.

An object of the present invention is to provide an improved directional air vent in which conveniently operable valving is a part of the directionally adjustable nozzle and which provides compactness in structure and effectiveness in operation.

A feature of the invention is a nozzle having a body in the form of a segment of a sphere with at least one passage through it and a flexible vane arranged selectively to control the extent of flow through that passage. Another feature is a universally movable air vent nozzle having multiple passages and flexible vanes within its structure and adapted to control flow through those passages.

These and other important features of the invention will now be described in detail in the specification and then pointed out more particularly in the appended claims.

In the drawings:

FIGURE 1 is an elevation view of an instrument panel for an automobile with two nozzle arrangements being shown thereon and each being of a type embodying the present invention;

FIGURE 2 is a sectional and enlarged view looking in the direction of the arrows 2—2 in FIGURE 1 with the nozzle being closed;

FIGURE 3 is a view looking in the direction of the arrows 3—3 in FIGURE 2;

FIGURE 4 is an enlarged sectional view looking in the direction of the arrows 4—4 in FIGURE 3;

FIGURE 5 is a view similar to that of FIGURE 3, but with the air vent nozzle open;

FIGURE 6 is an enlarged sectional view looking in the direction of the arrows 6—6 in FIGURE 5; and FIGURE 7 is an exploded perspective view of the air vent nozzle shown in FIGURE 2.

An automobile instrument panel 10 is shown in FIGURE 1 as being in known relation with a windshield 12, a toe board 14 and a steering column 16. An air distributing manifold 18 is concealed by the panel but is adapted to convey air to two air vent nozzles 20 and 22. The present invention is confined to novel aspects of one of these nozzles, although such nozzles are preferably used in pairs as illustrated.

In FIGURE 2 the nozzle 20 is shown to be composed of a body 24 in the form of a segment of a sphere and his body is supported for universal movement in the panel 10 with felt strips 26 interposed. The restraining or supporting of the body 24 in the panel 10 is readily undertaken by making the panel in two parts telescopically held together by means of a screw 30 as will be readily understood.

The body 24 defines a main cylindrical passage 32 which is divided into sectors by three radial webs 34 meeting in a common hub 36. The main passage 32 is also divided by a cylindrical baffle 38 as an aid in diffusing the air upon discharge as will be understood.

Journaled in the hub 36 is a shaft 40 which is knurled at one end as at 42 for attachment of a handle 44. The attachment is aided by a C-ring 46 and a spring washer 48 is interposed between the handle 44 and the hub 36. The other end of the shaft 40 bears a head 50 having three slots 52 therein. Each of these slots is not radial with respect to the shaft 40 but slightly offset with relation to the axis of the latter. One side of the head 50 may rotate against one end of the hub 36 when the handle 44 is manually rotated. The air inlet side of the nozzle 20 is indicated at 54 as being slightly enlarged with relation to the main passage 32 so that an annular shoulder 56 is formed on the body 24.

Three flexible vanes 60 are mounted in the enlarged inlet 54 and in the instant disclosure each of the vanes has one thickened margin 62 fixed to a radial web 34 by snap action as best illustrated in FIGURE 6. This margin also is provided with a lip 64 and one other thickened margin 65 of each flexible vane is provided with a groove 68. When the flexible vanes 60 are flattened out into one plane and in a closed position as shown in FIGURE 3, the margins 65 as well as the grooves 68 are not radial with respect to the nozzle but are somewhat offside from the radial direction and each is parallel and in engagement with a rib 34. The end of each 65 has an integral inner end portion 70 and three grooves 52 are formed in the head 50 of the shaft 40 to receive the three portions 70.

With the above construction, the nozzle body 24 may be turned universally to direct air in any selected direction into the passenger compartment. When it is desirable to shut off the flow of air through the valve body 24, the handle 44 is rotated so that the flexible vanes 60 will assume coplanar positions as shown in FIGURES 2, 3 and 4. In the closed positions, each margin 65 will snap over the ridge 64 of the next vane 60 making a sealed closure.

If the handle 44 is turned in the opposite direction, the head 50 will carry the portions 70 as well as the margins 64 from the closed positions of FIGURE 3 to the positions illustrated in FIGURE 5, thus opening the main passage and the three sectors thereof for the flow of air.

In order to facilitate the flexing of the vanes 60 each of the latter is reduced in thickness as at 80, 82 and 84 (FIGURE 6) and with the other portions of each vane being relatively stiff a folding or unfolding effect is realized whereby the valve action is made more positive.

I claim:

1. An air vent nozzle having a body in the form of a segment of a sphere having a main passage through it, a hub coaxial with said main passage, radial webs connecting said body to said hub for supporting the latter, each of said radial webs extending in a plane substantially parallel with said passage, flexible vanes each having one margin connected to one edge of one of said webs at the air entrance side of said main passage, and means passing through said hub from the air discharge side and connected to another margin of each of said vanes for opening and closing said main passage by flexing said vanes.

2. An air vent nozzle having a body in the form of a segment of a sphere defining a main passage leading through said segment and separated by radial webs of said body into sectors, a flexible vane for each of said sectors and having one margin fixed to one edge of one of said webs, and manually operable means extending through said segment and connected to another margin of said flexible vane whereby the latter may be flexed to control air flow through the corresponding sector.

3. An air vent nozzle having a body defining a main passage dividing the latter into sectors, radial webs in said main passage, flexible vanes of sufficient area to traverse and close one of said sectors, each of said vanes having a margin fixed to one edge of one of said webs, and means accessible at the other end portion of said main passage and connected to said vanes whereby the latter may be flexed simultaneously to open and close all sectors of said main passage.

4. An air vent nozzle having a body defining a main cylindrical passage, radial webs attached to said body and dividing said main passage into smaller passages, flexible vanes of sufficient area to traverse and close said smaller passages, each of said vanes having one margin fixed to an edge of one of said webs, said one margin having a lip parallel with said one web, one other margin on each of said vanes having a groove, and means coaxial with said main cylindrical passage and pivotally attached to said one other margin whereby said lip and groove may be caused to interlock when said smaller passages are closed by said flexible vanes and to be disengaged when said smaller passages are open.

5. An air vent nozzle as set forth in claim 4, each of said flexible vanes being reduced in thickness at spaced areas to effect a folding and unfolding of said vanes when said smaller passages are opened and closed.

6. An air vent nozzle having a body defining a main passage through it, a hub at the axis of said main passage, multiple webs attached to said body and hub and dividing said main passage into sectors, flexible vanes each having one margin connected to one edge of one of said webs, and means connected to another margin of each of said vanes whereby said vanes may be flexed to open and close said sectors.

References Cited by the Examiner

UNITED STATES PATENTS

| | | | |
|---|---|---|---|
| 2,462,989 | 3/1949 | Mufich et al. | 98—40 |
| 2,899,171 | 8/1959 | Simpelaar | 251—212 X |
| 3,060,960 | 10/1962 | Waterfill | 137—514 |
| 3,068,891 | 12/1962 | Panning et al. | 251—212 |

ROBERT A. O'LEARY, *Primary Examiner.*

M. PERLIN, *Examiner.*

W. E. WAYNER, *Assistant Examiner.*